R. TAINE.
PLANETARY GEARING.
APPLICATION FILED JUNE 18, 1913.

1,234,822.

Patented July 31, 1917.
2 SHEETS—SHEET 1.

Witnesses
Inventor
Roger Taine

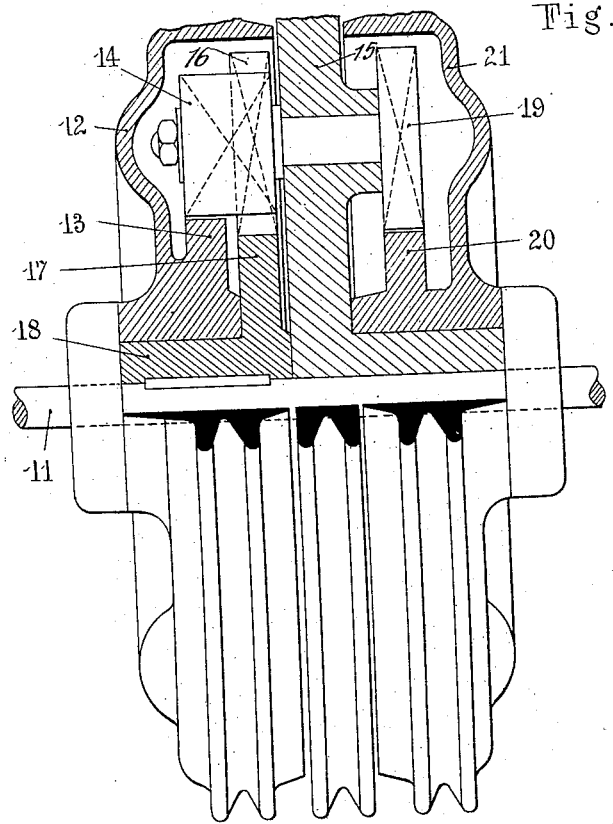
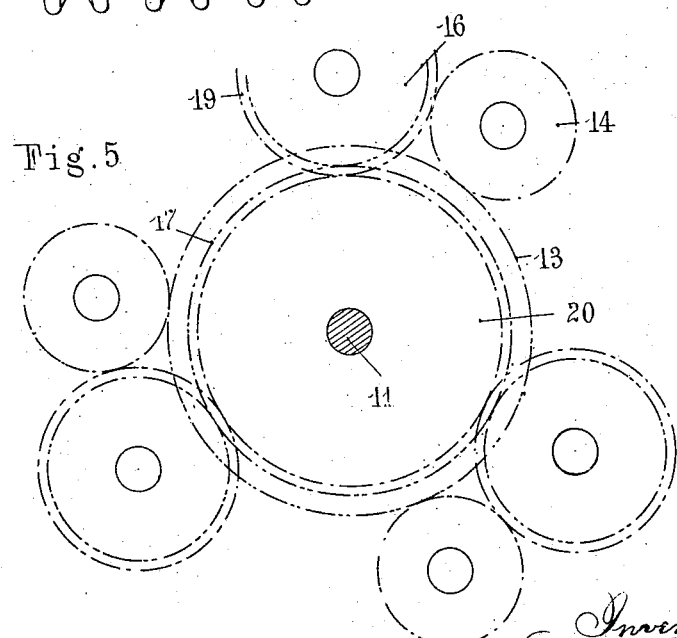

UNITED STATES PATENT OFFICE.

ROGER TAINE, OF FOURMIES, FRANCE.

PLANETARY GEARING.

1,234,822.  Specification of Letters Patent.  Patented July 31, 1917.

Application filed June 18, 1913. Serial No. 774,349.

*To all whom it may concern:*

Be it known that I, ROGER TAINE, citizen of the French Republic, residing at Fourmies, in the Department du Nord and Republic of France, have invented certain new and useful Improvements in Planetary Gearing, of which the following is a specification.

The present invention relates to a three phase planetary gearing formed of three independent parts in such a manner that any one of these parts may be driven continuously, while the other two are alternately subjected to the action of a brake or some other means for varying the speed or for entirely stopping them, for the purpose of imparting to a central shaft a movement of rotation which may be rapid or slow and in the same direction, in the opposite direction or two rotations in the same direction with small difference between the speeds according to the part controlled. This movement is mainly applicable to spinning frames and to machines for the preparation of textile materials, to hoisting apparatus and to capstans, to machine tools and to automobile vehicles, but it is also applicable to any other apparatus where it is desired that the same be driven at different speeds and in different directions.

Three examples of the invention are illustrated by way of example in the accompanying drawing, in which:

Fig. 4 shows the third example of the invention in side elevation partly in section, and Fig. 5 shows the same in diagrammatic front elevation illustrating the arrangement of the planet pinions.

Figure 1:
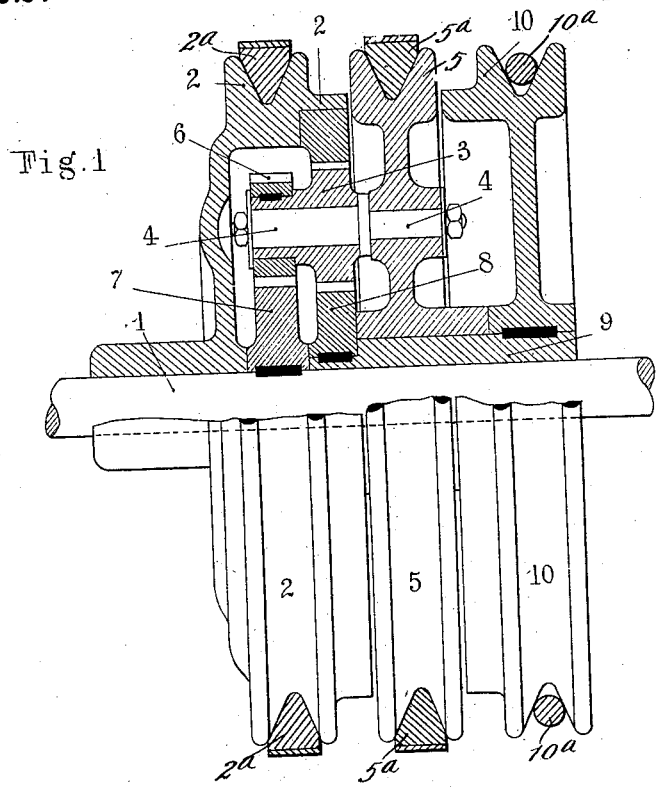
Figure 1 illustrates the first example in side elevation partly in section of the gear as a whole.

In the first example herein described and illustrated, the gearing comprises a central shaft 1 (Fig. 1) constituting the member to be driven or connected to a member to be driven by any appropriate means. An internally toothed wheel 2 rotates idly upon the shaft 1 and meshes with planet pinions 3 the number of which may vary but of which it is preferable to provide three, as shown in Fig. 2. These planet pinions are mounted loose upon shafts 4 bolted to a plate or driving member 5.

Mounted to rotate with each of these planet pinions 3 is a pinion 6 which meshes with a wheel 7 keyed upon the central shaft 1.

Furthermore, each of the planet pinions 3 meshes with a gear wheel 8 keyed upon a sleeve 9 keyed to a second plate or driving member 10, the said sleeve 9 rotating idly upon the shaft 1 and the third plate or driving member 5 rotating idly upon the sleeve 9.

With this arrangement the wheel 2, the planet pinions 3 and the wheel 8 are independent.

The gearing can be driven either by the wheel 2 or by the plate 5 or by the plate 10 by means of a cord, gear wheel, belt or any other appropriate transmission device $10^a$, but in each case the other members 2 and 5, which are not driven directly, are braked by the braking members $2^a$ and $5^a$, respectively at given times. The members not driven directly are subjected alternately to the action of a brake, in the case here illustrated by a cord brake.

In the first place assuming that the wheel 2 is being driven and the two brakes of members 5 and 10 are not acting so that they are free to rotate, the three phases are in this case obtained in the following manner.

*First phase—Effecting rotation of the shaft 1.*—This rotation is produced by braking the plate 5 and consequently locking the planet pinions 3. The gearing will then act as a simple train and impart the rotation of the wheel 2 to the shaft 1 through gears 6 and 7, the wheel 8 meanwhile rotating idly in the direction of the shaft 1.

The direction of rotation of the shaft 1 is opposite to the direction of rotation of the wheel 2 and the speed ratio is:

$$\frac{b}{a} = \frac{b}{c} \times \frac{f}{g}$$

assuming that $a$ designates the speed of rotation of the shaft 1, $b$ the speed of rotation of the wheel or plate 2, $c$ the speed of rotation of the pinion 3, $f$ and $g$ the speed of rotation of the gears 6 and 7, respectively.

*Second phase—Differential rotation of the shaft 1.*—This rotation is effected by the release of the plate 5 and the locking of the plate 10 by its corresponding brake.

By braking the plate 10, the wheel 8 which is motionless acts upon the planet pinions 3 driven by the wheel 2 in such a manner as to cause them to rotate in the direction of the wheel 2. This rotation is constantly less than that of the wheel 2, no matter what the number of teeth may be.

The planet pinions 3 and the pinions 6 are subjected to two movements: (1) a movement revoluble around the shaft 1 and (2) a movement of rotation upon their pivots 4.

If gear wheels 6 and 3 have the same number of teeth, the wheels 7 and 8 will also have the same number of teeth and consequently the central shaft 1 is motionless. If gear wheel 6 has a greater number of teeth than the gear wheel 3, necessarily gear wheel 7 has a less number of teeth than gear wheel 8 and the minus direction of the shaft 1 is obtained, because gear wheel 6 rolls more than gear 3 and furnishes to gear 7 a larger number of teeth than the number furnished by gear 3 to 8, and consequently the gear 7 and therefore the shaft 1 rotates reversely, that is to say in the minus direction.

If gear wheel 6 has a less number of teeth than the gear 3, necessarily, the gear 7 has a greater number of teeth than the gear 8 and the plus direction of the shaft 1 is obtained because, as gear 6 rolls less than gear 3 it furnishes to gear 7 a number of teeth less than the number that the gear 3 furnishes to the gear 8, that is to say it drives it in the same direction.

The speed of the shaft 1 in either direction may be determined by the ratio of $$\frac{c}{h} \times \frac{f}{g}$$

in which $c$ designates the number of teeth on the pinion 3, $h$ the number of teeth on gear 8 and $f$ and $g$ the number of teeth on gear wheels 6 and 7, respectively. Since $c$ and $h$ remain constant, the difference in speed depends upon the number of teeth on the pinions 6 and 7, which values are necessarily small.

*Third phase—Release of the central shaft 1.*—The central shaft 1 is released from rotation with the wheel 2 by the disengagement of the brakes 5 and 10 which then rotate idly upon 1 and free 7 from all rotation.

Now assuming that the plate 5 is driven and that the plates 2 and 10 are mounted with brakes, the following results will be obtained:

*First phase—Relatively rapid or slow rotation of the shaft 1.*—Relatively rapid rotation of the shaft 1 is produced by braking the wheel 2. As the planet pinions 3 experience a movement of rotation around the shaft 1 they have a tendency to cause the gear 7 to rotate through the pinion 6 in the same direction and at a speed which would be the same assuming them to be motionless upon their pivots 4; but the wheel 2 being blocked the tendency for them to rotate around the pivots 4 is also produced and as this rotation is in the same direction to their planetary rotation, the gear 7 is given a rotary movement which is always greater than that of the member 5 and in the same direction. The relatively slow rotation of the shaft 1 is obtained by releasing the wheel 2 and locking the plate 10.

*Second phase—Differential rotation of the shaft 1.*—The differential rotation in the minus or plus direction obtained by this control is substantially the same as that of the second speed of the preceding control, that is to say the gear 8 is fixed and the planet pinions 3 drive the shaft 1 through gears 6 and 7 as before, with the sole difference that they are driven by the member 5 instead of being driven by the member 2. The value of the minus or plus direction depends, as before, upon the ratio $$\frac{c}{h} \text{ and } \frac{f}{g}$$

*Third phase—Release of the shaft 1.*—As before, the release of the shaft 1 is produced by the release of the brakes for the plates 2 and 10.

Finally, assuming that the wheel 10 is driven and that the members 2 and 5 are mounted with brakes, the following results are obtained:

*First phase—Effective rotation of the shaft 1.*—This rotation is produced by the braking of the plate 5 locking the planet pinions 3 which act as a simple train of gearing to drive the shaft 1 in the same direction of rotation as the wheel 10.

The speed ratio is as follows:

$$\frac{i}{a} = \frac{h}{c} \times \frac{f}{g}$$

assuming that $a$ designates the speed of rotation of the shaft 1, $i$ the speed of rotation of the plate 10 and $c$, $f$, $g$, and $h$, respectively, designate the number of teeth on the gears 3, 6, 7 and 8.

*Second phase—Differential rotation of the shaft 1.*—This rotation is produced by the release of the member 5 and the braking of the member 2. This control does not furnish the minus direction, but two plus directions at a greater or less speed. The wheel 2 being blocked, the planet pinions 3 rotate in the direction of wheel 10. If pinion 6 has the same number of teeth as pinion 3, and gear 7 the same number of teeth as gear 8, the speeds of rotation are the same and the rotations are in the same direction, whether the members 2 or 5 are held against rotation.

If the pinion 6 has a less number of teeth than the pinion 3 and the gear 7 a greater number of teeth than the gear 8, the shaft 1 rotates at a speed slightly less than the speed of the member or wheel 10, and in the same direction as this wheel. Conversely, if the pinion 6 has a greater number of teeth than the pinion 3 and the gear 7 a less number than the gear 8, the shaft 1 will be rotated at a speed greater than the speed of rotation of the wheel or plate 10 and in the same direction.

*Third phase—Release of the shaft 1.—* This release is also produced by the release of the brakes.

Figure 2:
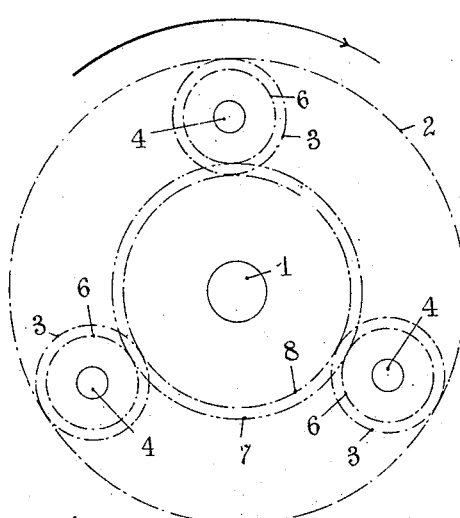
Fig. 2 illustrates the same in a diagrammatic front elevation indicating the position of the planet pinions which form part of the movement.
Figure 3:
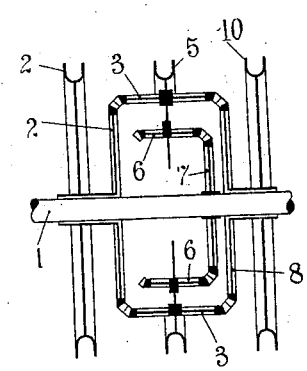
Fig. 3 represents a second example in diagrammatic section and side elevation.

The movement in accordance with the second example of the invention is identical with that of the first example but instead of the pinions being spur pinions bevel pinions are employed; the only difference in the result obtained is that the effective and differential speeds are in less sharply defined ratios than in the gear with spur pinions, owing to the fact that in Fig. 3 the pinion 2 corresponds in dimensions to the pinion 8 while in Figs. 1 and 2, the wheel 2 is necessarily larger than 8.

In accordance with the third example of the invention, the movement is characterized by the elimination of the internal teeth of the wheel loose upon the central shaft.

In accordance with Figs. 4 and 5, 11 is the central shaft, 12 the idle wheel comprising internally a toothed ring 13 meshing with planet drums 14, preferably three in number, the shafts of which are mounted upon one of the faces of the plate 15 mounted freely upon the shaft 11. Upon this same side of the plate 15 the pivots of the planet pinions 16 are also mounted; these pinions mesh with the drums 14 and with a toothed ring 17 integral with a sleeve 18 keyed upon the shaft 11.

In utilizing the shafts of the planet pinions 16 there are mounted upon the other face of the plate 15 other planet pinions 19 meshing with a toothed ring 20 integrally formed internally with a wheel 21 mounted loosely upon the sleeve of the plate 15.

With this variation in the construction of this gearing, the operation remains the same for the three cases of control set forth for the first two constructional forms described above.

It is obvious that apart from these three constructional forms various other embodiments of the invention might be adopted without departing from its principle and similarly the arrangement and execution of the members of this type of three speed gearing movement might vary in other respects without affecting the scope of the invention as set forth in the appended claims.

What I claim is:

1. In a power transmitting device, a rotary part adapted to be driven, three members capable of rotation independently of said part and of each other and means for driving said part by positively rotating any one of said members and by preventing the rotation of one or the other of the other two members.

2. In a power transmitting device, a rotary part adapted to be driven, three members capable of rotation independently of said part and of each other, and means for driving said part by positively rotating any one of said members and by preventing the rotation of one or the other of the other two members, but not when each of the other said members is free to rotate.

3. In a power transmitting device, a rotary part adapted to be driven, three members capable of rotation independently of said part and each other, and means for driving said part by positively rotating any one of said members and by preventing the rotation of one or the other of the other of said members to obtain different speed ratios between said driving member and said part, or for obtaining rotation of said member and part in opposite directions depending upon which of the members are positively rotated and which are prevented from rotation.

4. In a power transmitting device, a shaft, three members loosely mounted thereon, each of said members being capable of rotating independently of said shaft and of each other, and planetary gearing connecting said members to said shaft for rotating the shaft by positively rotating any one of said members and preventing the rotation of one or the other of the remaining two members.

5. In a power transmitting device, a shaft, three rotary members loosely mounted thereon capable of rotating independently of said shaft and of each other, a gear-wheel on said shaft, two pinions rigidly secured together and rotatably mounted on the intermediate one of said members, one of said pinions meshing with the gear-wheel on said shaft, a gear-wheel rigidly secured to one of the outer members and meshing with the other of said pinions, a gear-wheel carried by the remaining one of said members operatively connected with said last named pinion and means for driving one of said members and for braking the two remaining members.

6. In a power transmitting device, a shaft, three rotary members loosely mounted thereon capable of rotating independently of said shaft and of each other, a gear-wheel on said shaft, two pinions rigidly secured together and rotatably mounted on the intermediate one of said members, one of said pinions meshing with the gear-wheel on said shaft, a gear-wheel rigidly secured to one of the outer members and meshing with the other of said pinions, an annular gear-wheel carried by the remaining one of said members in mesh with said last named pinion and means for positively driving one of said members and for braking the two remaining members.

In testimony whereof I affix my signature in presence of two witnesses.

ROGER TAINE.

Witnesses:
C. A. CAUX,
EMILE SCHALDENBRAND.